Figure 1:
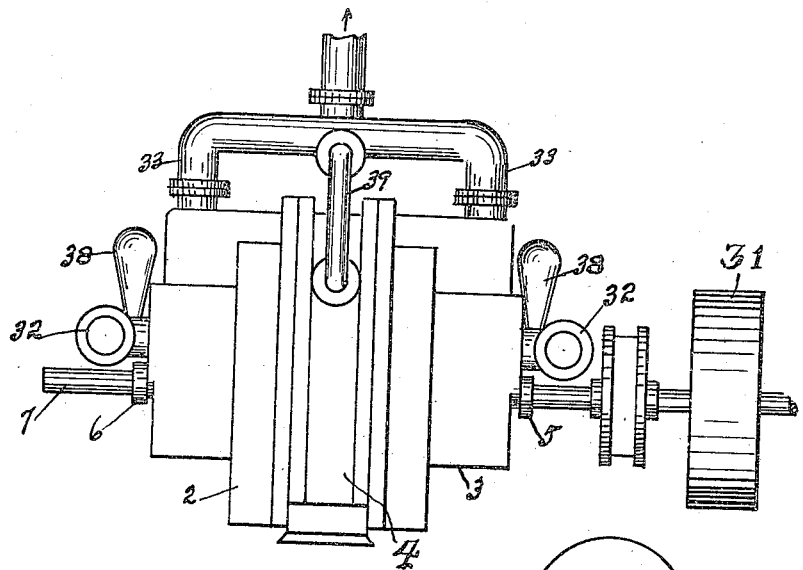

E. F. OSBORNE.
PROCESS OF COMPRESSING AIR, GAS, OR OTHER GASEOUS FLUIDS.
APPLICATION FILED NOV. 23, 1905.

960,233.

Patented May 31, 1910.
6 SHEETS—SHEET 1.

WITNESSES:
J. W. Carroll.
C. M. Burman

INVENTOR
Eugene F. Osborne
BY
Harry Lea Dodson.
ATTORNEY

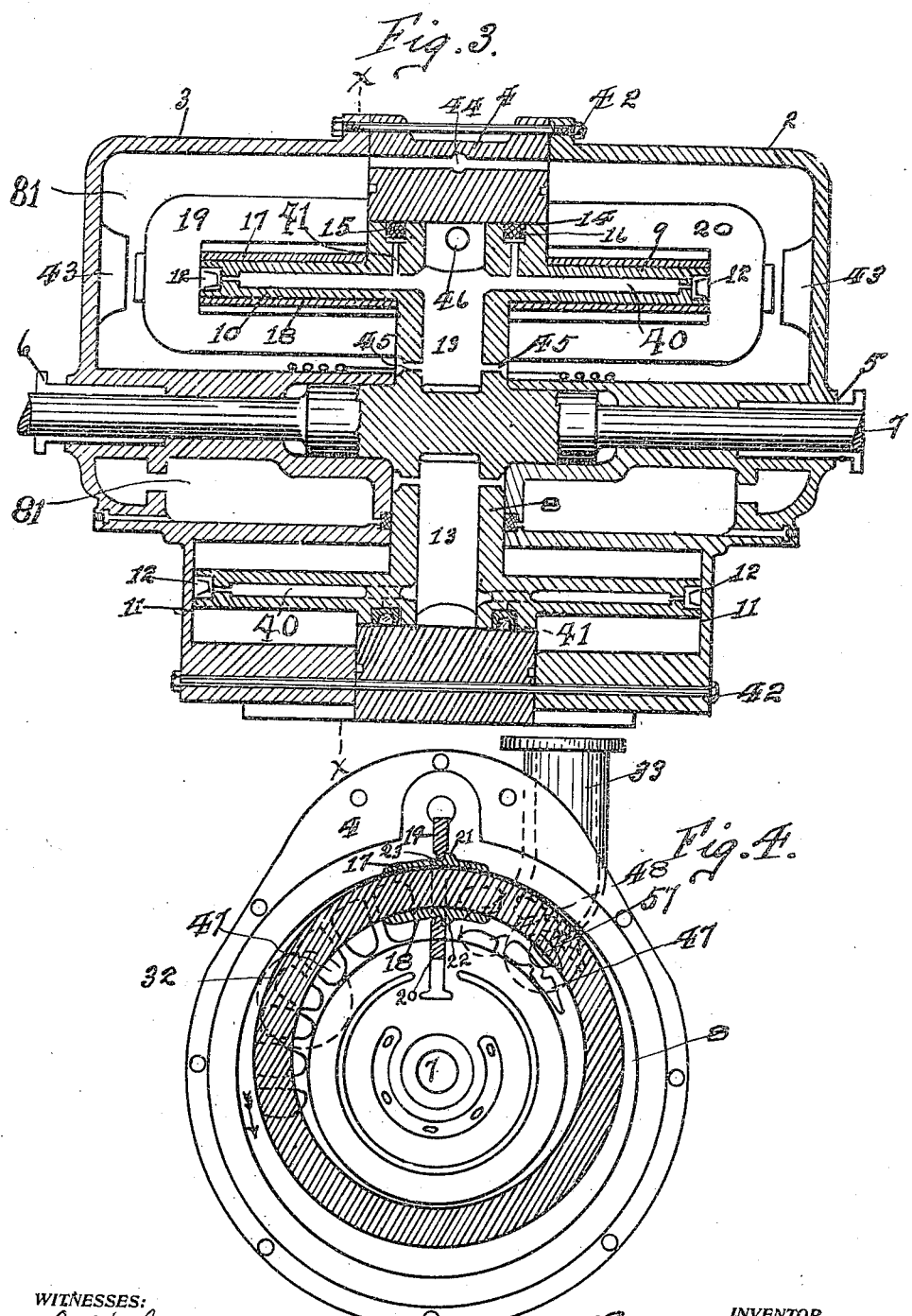

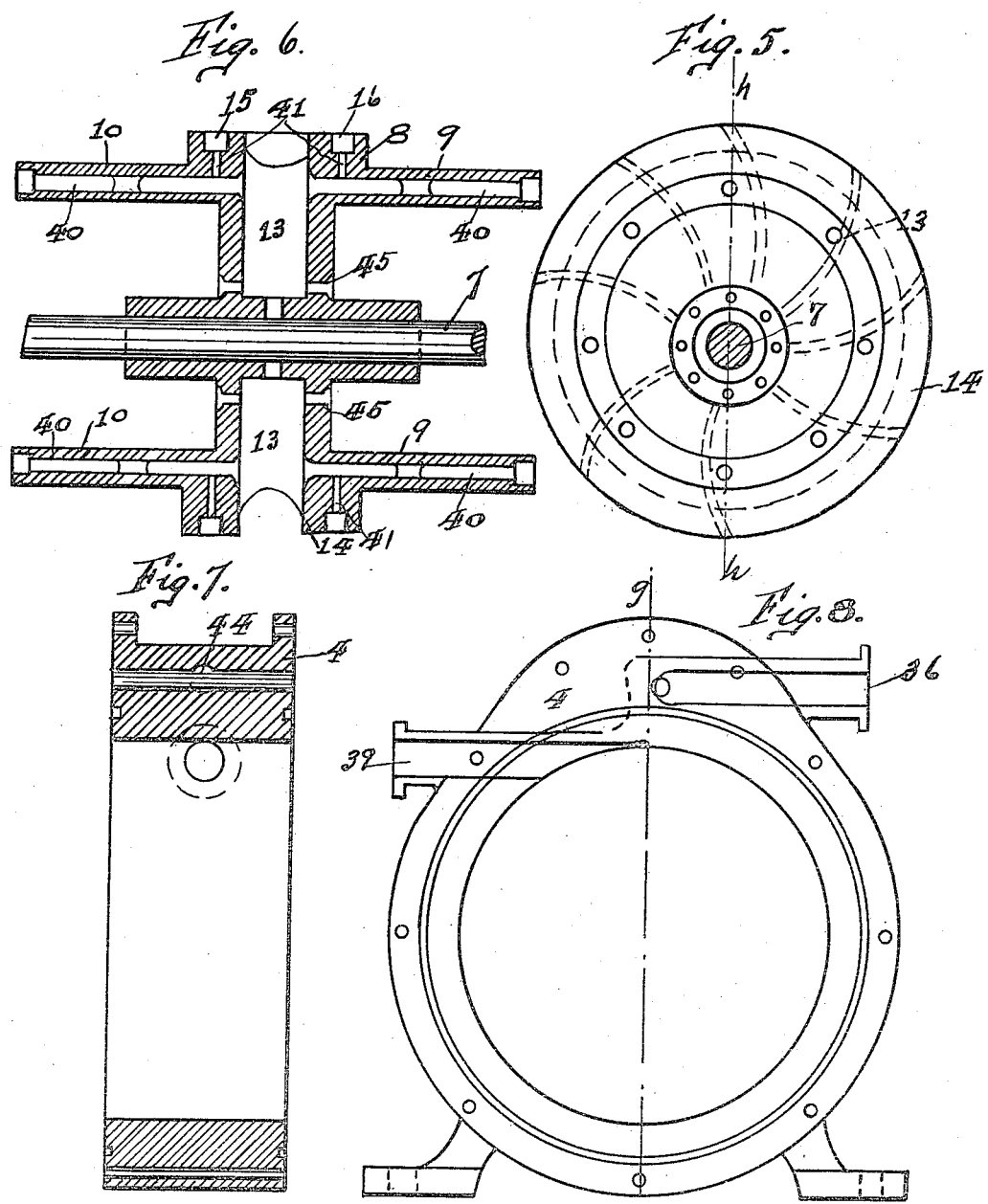

E. F. OSBORNE.
PROCESS OF COMPRESSING AIR, GAS, OR OTHER GASEOUS FLUIDS.
APPLICATION FILED NOV. 23, 1905.
960,233.
Patented May 31, 1910.
6 SHEETS—SHEET 4.
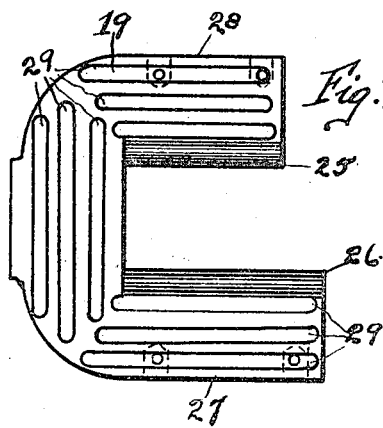
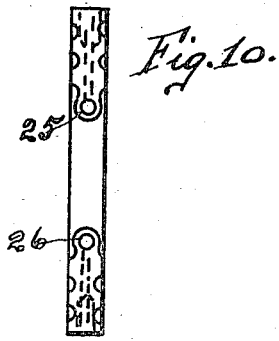
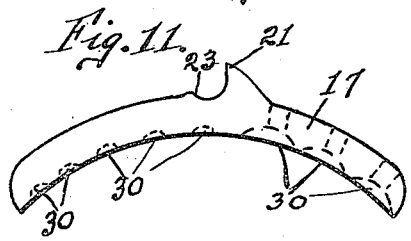
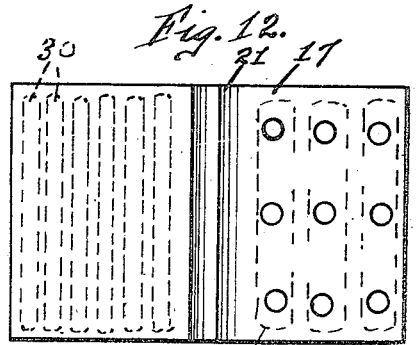
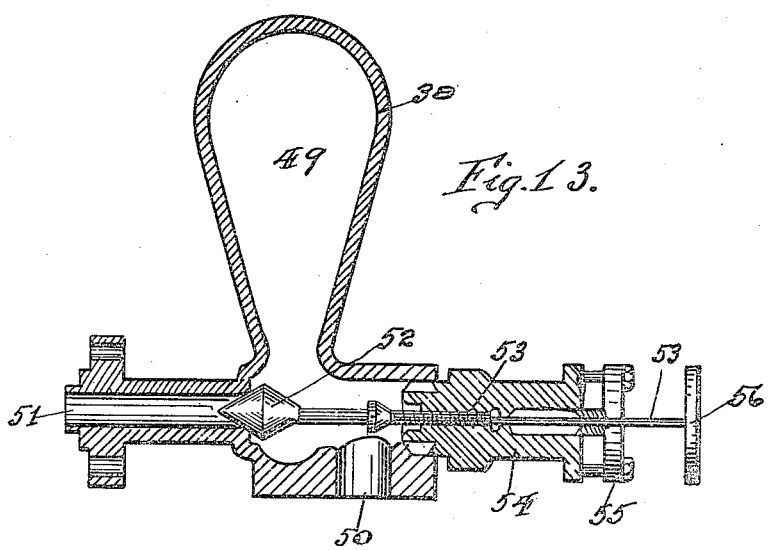
WITNESSES:
J. W. Carroll.
C. M. Burnam
INVENTOR
Eugene F. Osborne
BY
Harry Lea Dodson
ATTORNEY E. F. OSBORNE.
PROCESS OF COMPRESSING AIR, GAS, OR OTHER GASEOUS FLUIDS.
APPLICATION FILED NOV. 23, 1905.
960,233.
Patented May 31, 1910.
6 SHEETS—SHEET 5.
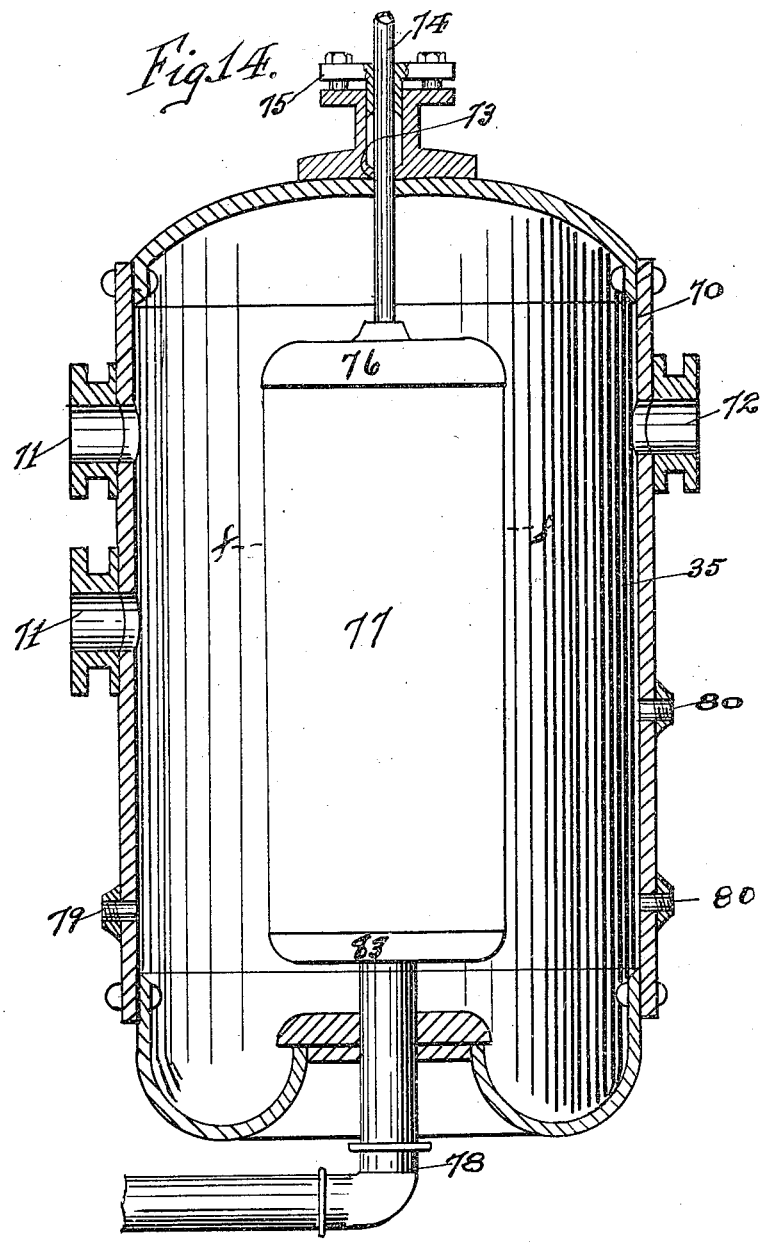
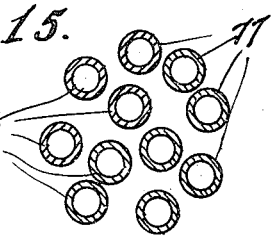
WITNESSES:
J. W. Carroll
C. M. Burman
INVENTOR
Eugene F. Osborne
BY
Harry Lea Dodson
ATTORNEY E. F. OSBORNE.
PROCESS OF COMPRESSING AIR, GAS, OR OTHER GASEOUS FLUIDS.
APPLICATION FILED NOV. 23, 1905.
960,233.
Patented May 31, 1910.
6 SHEETS—SHEET 6.
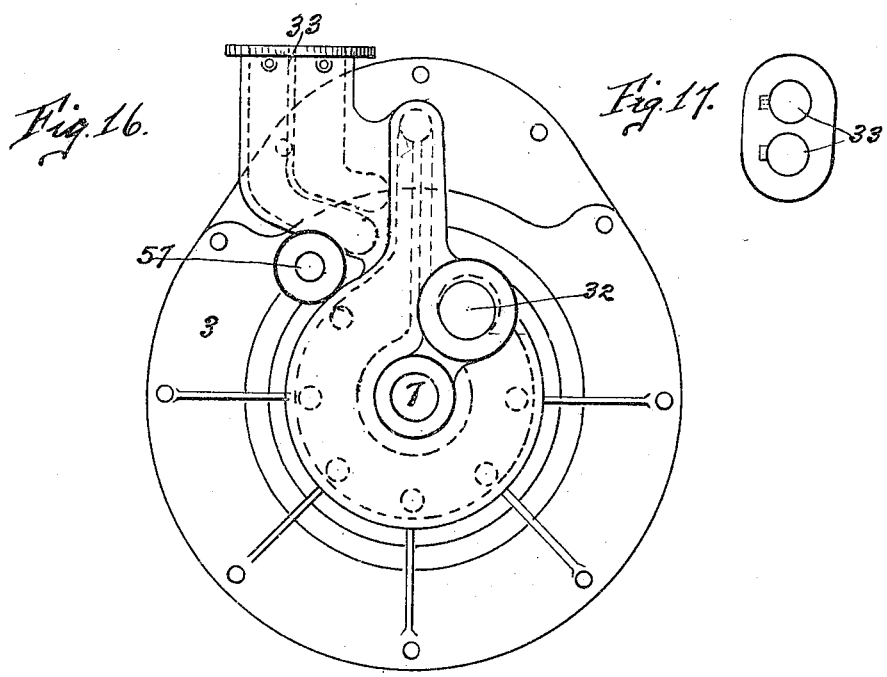
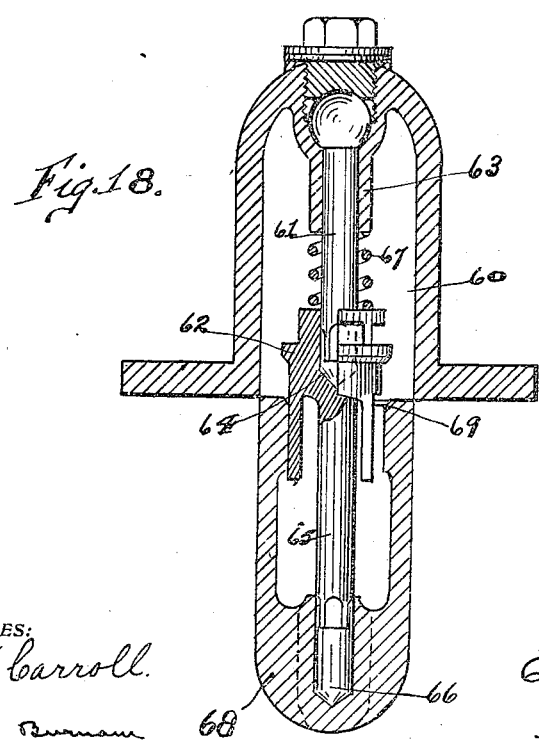

UNITED STATES PATENT OFFICE.

EUGENE F. OSBORNE, OF CHICAGO, ILLINOIS, ASSIGNOR TO HENRY A. BRANCH, OF CHICAGO, ILLINOIS.

PROCESS OF COMPRESSING AIR, GAS, OR OTHER GASEOUS FLUIDS.

960,233. Specification of Letters Patent. Patented May 31, 1910.

Application filed November 23, 1905. Serial No. 288,652.

*To all whom it may concern:*

Be it known that I, EUGENE F. OSBORNE, a citizen of the United States, residing at Chicago, in the county of Cook and State of Illinois, have invented a certain new and useful Process of Compressing Air, Gas, or other Gaseous Fluids, of which the following is a specification.

My invention has for its object to provide a process which shall consist of various steps which if followed will result in a compression in which practice will more nearly approximate theory than is possible in any of the processes with which I am familiar at the present time—that is to say, in the compressing of air there is a very considerable loss in efficiency due to the rise in temperature caused by the compression. Even when the most approved methods of cooling are utilized this loss in efficiency is very considerable. In other words, all compression is adiabatic and it is my intention to produce a process which if followed will more clearly approximate isothermal compression than is possible under the present conditions. One of the reasons, if not the principal reason, why this result cannot be attained in the methods of compression now in use is due to the impossibility of bringing the cooling agent in contact with all of the air which is being compressed, the most common method being that of water-jacketing. It is perfectly obvious that this method only succeeds in cooling the air which lies next to the cylinder walls which are cool while the large body of air in the central part of the cylinder fails absolutely to come in contact with the cooling agent. This defect was sought to be overcome by the introduction of the jet or spray of water into the interior of the cylinder. This succeeded in raising the efficiency somewhat but still only brings that portion of the air which happens to be in contact with the water to a reduced temperature. By the use of my improved process the air to be compressed is compressed in a lamina and not only are all four sides brought in contact with the cooling surface, but the cooling agent is introduced into the compression chamber and serves to bring the air into actual contact with it. The compressed mixture is then led to an intercooler and is then brought into contact with a cooling agent which precipitates the mixture out of the compressed air. This moisture is then used in cooling the compressed mixture over and over, it being obvious that if filtered water is used in the first place that it will stay perfectly clean and, as a consequence, no scale will be formed in the interior of the compression chamber or on the surfaces of any of the working parts thereof.

My method may be more readily understood by having reference to the accompanying set of drawings, which are hereunto annexed and are a part of this specification, which I use in this instance merely to illustrate one set of mechanical means which may be employed in carrying out my process, and in which—

Figure 2:
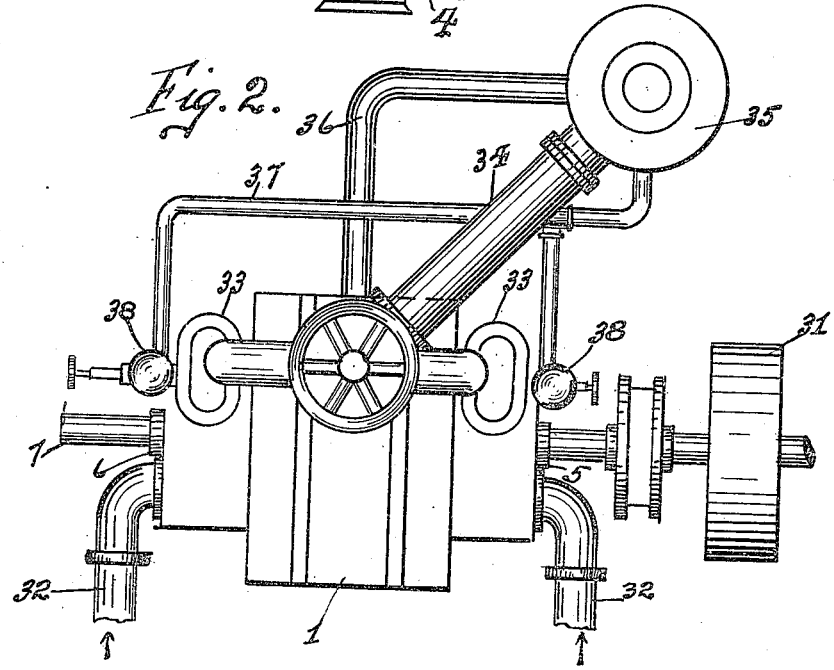

Figure 1 is a side elevation of a compressor which would utilize my process. Fig. 2 is a top or plan view thereof. Fig. 3 is a longitudinal sectional view of the compressor taken through the center thereof. Fig. 4 is a sectional view taken upon the line X X in Fig. 3. Fig. 5 is an enlarged detail view of the piston. Fig. 6 is a cross section on line $h$, $h$ in Fig. 5. Fig. 7 is a cross section taken on line $g$, $g$ in Fig. 8. Fig. 8 is a detail view of the central shell showing the inlet and discharge for the cooling fluid. Fig. 9 is a side view of one of the crossheads. Fig. 10 is an end view of the same. Fig. 11 is a side view of one of the crosshead shoes. Fig. 12 is a top or plan view of the same. Fig. 13 is a view partly in section of the air chamber. Fig. 14 is a view partly in section of the intercooler. In this view the central portion is shown in outline but consists of a series of pipes which are illustrated in the next figure. Fig. 15 is a cross sectional view on line $f$, $f$ showing the arrangement of the pipes for carrying the cooling agent. Fig. 16 is an end elevation of the end shell of the compressor showing the induction and eduction ports as well as the induction port for the cooling agent. Fig. 17 is a top or plan view of the eduction ports. Fig. 18 is a sectional view of one of the discharge valves which are mounted in the eduction ports.

Similar figures refer to similar parts throughout the entire description.

In the drawings, Figs. 1 and 2, 1 is a compressor having air inlets 32 and outlets 33, a pipe 34 to lead the compressed mixture to an intercooler 35, a pipe 36 leading the cooling agent to jacket the compressor to the same, and a pipe 37 leading the cooling mixture to air cushions 38, whence it is carried into the compression chamber. Pipe 39 serves to carry the cooling agent which is used for jacketing purposes back to the intercooler. The compressor 1 is formed of three parts, consisting respectively of an outer end shell 2, an outer end shell 3 and a central shell 4. The outer shells have journal bearings 5 and 6, in which is mounted a shaft 7. This shaft may be driven by any suitable power, not shown. In Figs. 1 and 2 the shaft is driven through the medium of a pulley 31 by a power not shown and has a piston 8 formed integral therewith although it may be found desirable in practice to construct the piston proper in one part and mount a shaft therein, as better shown in Fig. 6, detail view of the piston. This piston is attached to the shaft and has extending near its periphery eccentric piston rings 9 and 10. These rings bear against the inner face 11 of the two end shells, a suitable packing 12 being mounted in recesses in said rings. The central portion of the piston has a series of veins 13 cast or formed therein, these veins extending nearly to the periphery of said piston. The outer periphery 14 of the piston bears against the internal surface of the central shell 4 and has circumferential grooves 15 and 16 in which may be mounted suitable packing. The piston rings 9 and 10 have mounted and slidable thereon crosshead shoes 17 and 18. These shoes, as better shown in the detail views, have a series of water grooves 30 extending across the face thereof, and shoulders 21 and 22 at or near the center thereof and extending across the back of said shoes, these shoulders having grooves 23 and 24 therein fitting to and coinciding with shoulders 25 and 26, upon the cross-heads 19 and 20. These shoes move with the said cross-heads. These crossheads are constructed in rather a peculiar shape, better seen in detail views 9 and 10, and consist of a plate of metal in the form of an arch having legs 27 and 28, the leg 28 being shorter than the opposite one 27, the inner edge of said legs being formed into rounded shoulders 25 and 26 to fit tightly upon the grooves upon the cross-head shoes. Water grooves 29 are formed in each of the side faces of the said cross-heads. The piston rings 9 and 10 of the piston have ports or passages 40 therein for the passage of water and branch ports or passages 41 leading to the packing recesses 15 and 16. The two end shells are secured to the central shell by means of stay bolts 42. Stops 43 are provided in the inner face of the end shells opposite the cross-heads to prevent too great endwise movement. The water, in the event of that being employed for a cooling agent, is led to the inner shell through the pipe 36, thence through the port or passage 44 into the interior of the two end shells, and occupies all of the various chambers, shown in Fig. 3, and passes from them through ports or passages 45 which are provided in the piston and is carried thence through the internal ports or passages 40 to the various packings. At the same time it will be obvious that the flanges 9 and 10 are filled with the cooling agent.

The circulation of the water is produced by the rotation of the piston, the veins 13 acting as a rotary pump and ejecting the water through the opening 46, whence it is carried back through the pipe 39 to the intercooler. The air enters the interior of the compressor through the pipe 32 and thence into the compression chamber through ports which are shown in Fig. 4. These ports 47 are constructed in a rather peculiar shape in order to carry the same amount of the fluid which is to be compressed both to the inner and outer compression chambers. Exhaust ports 48 are provided leading to the eduction valves which are located in the pipe 33, whence the mixture is carried to the intercooler. An inlet port or passage 57 is provided for the introduction of the cooling agent into the compression chamber, said port being automatically uncovered by the action of the piston. This port or passage leads from one of the air cushions 38, better shown in Fig. 13, which is an enlarged sectional view thereof. These air cushions 38 are formed with a dome 49, an inlet port 50, an eduction port or passage 51, a cone valve 52, the stem 53 of which passes through a stuffing box 54, and is threaded therein. This stuffing box is provided with a smaller stuffing box 55 at its extremity to provide a means of packing the rod or valve stem 53. This valve serves to regulate the discharge through the eduction port 51, a hand wheel 56 being provided to enlarge or decrease the area of the said eduction port in proportion to the height of pressure to which the compression is being carried. It may also be made to close the eduction port entirely if desired.

The discharge valves and chambers, one of which is shown in Fig. 18, are mounted in the eduction ports 33 and are constructed as shown in the detail view, of a chamber 60, the upper part of which has depending downwardly therefrom a neck or stem 63, which has mounted therein a stem 61 which serves as a guide for the valve 62. This valve is formed with a dashpot 64 into which the guide or stem 61 extends. The valve 62 has a stem 65 depending downwardly therefrom which enters into a dashpot 66, the lower part of these two stems being cut away to provide for the exit of the liquid from the dashpots. A spring 67 is provided to prevent the valve striking against the stem 63 of the chamber 60; the lower end 68 of this chamber fits tightly into the eduction ports 33. The valve 62 remains open practically all the time except when the compressor is shut down, when it seats itself upon the valve seat 69 provided therefor.

Fig. 14 is a view partly in section of the intercooler 35. This cooler consists of a cylinder or shell 70 having inlets 71 for the entrance of the compressed mixture and an eduction port 72. A cooling agent enters an opening 73 at the top of the shell 70 through a pipe 74, this opening being provided with a stuffing box 75 of ordinary construction. The pipe 74 leads to a head 76 from which the cooling agent is conducted through a series of tubes 77, better seen in cross section of the same shown in Fig. 15. These tubes enter into a corresponding head 83 from which the cooling agent is led away through the pipe 78. Liquid inlet and outlet ports 79 and 80 are provided for the egress and return of the condensed liquid.

The operation is as follows: The fluid which is to be compressed passes through the inlet pipe 32 and through the ports or passages 33 where it enters the compression chamber 81 which is divided into what are practically two chambers, an inner and an outer one, the division being formed by the piston dividing the compression chamber so that there is in effect one chamber inside of the piston and another outside of it. The ports 33 are automatically uncovered by the rotation of the piston 8. This piston, as shown in Fig. 4, having covered all of the inlet ports in the outer compression chamber, the piston being rotated in the direction indicated by the arrows, pushes and crowds the air around in advance and at the moment when the compression is approaching the maximum the downward travel of the piston 8, caused by its rotation due to the eccentricity of the piston rings, will uncover the port 57 through which the cooling agent is introduced into the compression chamber. This water, in the event of water being employed as a cooling agent, enters the air cushions through the inlet port 50 which may be provided with a check valve of ordinary construction, and crowds or compresses the air in the dome 49 and is held there under pressure. The instant that the piston on its downward motion uncovers the inlet port 57, the water is injected with a rush which sprays the water violently and intermixes it thoroughly with the fluid which is being compressed at the very instant when it is the most needed, namely, when the compression is approaching its maximum and the heat resultant therefrom is at its greatest degree. The compressed mixture is then discharged through the eduction ports 33 and is led thence to the intercooler 35 where it is brought in contact with the surface of the tubes 77 through which is constantly passing a cooling agent. This causes a precipitation of that portion of the condensable part of the mixture which can be condensed; a part of the liquid resulting therefrom is led off through the opening 79 through the pipe 36, whence it is conducted to the interior of the compressor shell, the pipe 37 carrying a part of this condensed liquid to the air cushions 38. A corresponding action takes place in the internal compression chamber in the inner side of the piston. The size of the ports, the length of the cross-heads and other parts being proportioned so that the same amount of fluid will be compressed on both sides of the piston rings 9 and 10 of the piston. As the piston rotates and moves up and down it carries the cross-heads 19 and 20 up and down and slides between the cross-head shoes 17 and 18, the cross-heads serving as a stop to prevent the mixture to be compressed from passing on around as the piston is rotated. The result is that as far as possible the compression chambers are balanced and as much pressure is exerted on one side of the piston rings 9 and 10 as on the other. It will be obvious that the air entering through the ports into a compression chamber is shaped so that it assumes the form of lamina, and the flanges of the piston having their internal surfaces cooled, the cross-heads being mounted in and surrounded by water, the entire shell of the compression chamber being in contact with water, that all the internal surfaces of the compressing device are in contact with water, should that be employed as a cooling agent.

Carrying the water as I do from the intercooler 35, it will be obvious that it is under pressure, and leading it as I do to the various packings, it is readily apparent that there is a positive resistance to any passage of the fluid which is being compressed, and all that the veins 13 on the piston 8 have to do is to keep up a circulation of this water. It being all under uniform pressure, it simply pushes it along without having any particular amount of work to do. It passing through the opening 46 is returned to the cooler and inasmuch as the hotter portion of the water will rise, it is apparent that only the coldest part of the condensed water will be led to the compressing device.

Having described my invention, what I regard as new and desire to secure by Letters Patent is—

1. The process herein described which consists essentially of conducting the fluid to be compressed into a compression chamber, of lunate form, of a rotary compressing device, therein compressing it in lamina by varying the volume of the compression chamber, bringing a cooling agent in contact with the internal surfaces of the compressing device, and also intermixing the cooling agent with the fluid in the act of compression, for the purpose set forth, substantially as described.

2. The process herein described which consists essentially of conducting the fluid to be compressed into a compression chamber, of lunate form, of a rotary compressing device, therein compressing it in lamina by varying the volume of the compression chamber, bringing a cooling agent in contact with the internal surfaces of the compressing device and also intermixing the cooling agent with the fluid in the act of compression, thence conducting the mixture to a separating chamber wherein it is brought in contact with cooling surfaces, thus causing a precipitation of a portion of the condensable part of the mixture and using the cooled liquid resulting therefrom as a cooling agent for the compressor and the fluid being compressed, for the purpose set forth.

3. The process herein described which consists essentially of conducting the fluid to be compressed into a compression chamber of lunate form, of a rotary compressing device, therein compressing it in lamina by varying the volume of the compression chamber, bringing a cooling agent in contact with the internal surfaces of the compressing device and introducing the cooling agent intermittently into the compression chamber during compression, for the purpose set forth.

4. The process herein described which consists essentially of conducting the fluid to be compressed into a compression chamber of lunate form, of a rotary compressing device, therein compressing it in lamina by varying the volume of the compression chamber, bringing a cooling agent in contact with the internal surfaces of the compressing device and also intermixing the cooling agent with the fluid in the act of compression, thence conducting the mixture to a separating chamber wherein it is brought in contact with cooling surfaces, thus causing a precipitation of a portion of the condensable part of the mixture and using the cooled liquid resulting therefrom as a cooling agent for the compressor and the fluid being compressed, the said cooling agent being at all times subjected to the head pressure of the system and circulated through the compressor and thence returned to the cooling chamber to be cooled, for the purpose set forth.

5. The process herein described which consists essentially of conducting the fluid to be compressed into a compression chamber, of lunate form, of a rotary compressing device, therein compressing it in lamina by varying the volume of the compression chamber, bringing a cooling agent in contact with the internal surfaces of the compressing device, for the purpose set forth, substantially as described.

EUGENE F. OSBORNE.

Witnesses:
J. H. CARROLL,
H. L. DODSON.